United States Patent
Sun et al.

(10) Patent No.: US 10,922,517 B2
(45) Date of Patent: Feb. 16, 2021

(54) PIXEL CIRCUIT AND DISPLAY PANEL

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Kuo Sun, Beijing (CN); Haijun Yin, Beijing (CN); Fei Liu, Beijing (CN); Jianqiang Liu, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/475,065

(22) PCT Filed: May 30, 2018

(86) PCT No.: PCT/CN2018/089033
§ 371 (c)(1),
(2) Date: Jun. 28, 2019

(87) PCT Pub. No.: WO2018/223878
PCT Pub. Date: Dec. 13, 2018

(65) Prior Publication Data
US 2019/0325189 A1    Oct. 24, 2019

(30) Foreign Application Priority Data
Jun. 5, 2017   (CN) .......................... 2017 1 0417082

(51) Int. Cl.
*G09G 3/3258*    (2016.01)
*G06K 9/00*    (2006.01)

(52) U.S. Cl.
CPC ....... *G06K 9/0002* (2013.01); *G06K 9/00053* (2013.01); *G09G 3/3258* (2013.01)

(58) Field of Classification Search
CPC . G06K 9/0002; G06K 9/00053; G09G 3/3258
See application file for complete search history.

(56) References Cited

U.S. PATENT DOCUMENTS 9,922,595 B2 *   3/2018   Hirai .................... G09G 3/3225
2006/0067564 A1   3/2006   Miyasaka
(Continued)

FOREIGN PATENT DOCUMENTS

CN    104103239 A    10/2014
CN    104112120 A    10/2014
(Continued)

OTHER PUBLICATIONS

International Search Report and Written Opinion issued in corresponding International Application No. PCT/CN2018/089033, dated Aug. 10, 2018, with English translation.
(Continued)

*Primary Examiner* — Robert J Michaud
(74) *Attorney, Agent, or Firm* — McDermott Will and Emery LLP

(57) ABSTRACT

A pixel circuit includes a driving sub-circuit, a writing sub-circuit, a light-emitting device and a fingerprint information output sub-circuit. The writing sub-circuit is coupled to the driving sub-circuit, a first signal terminal and a data signal terminal, which is configured to write a data signal to the driving sub-circuit under control of a signal from the first signal terminal. The driving sub-circuit is coupled to an anode of the device and a first voltage terminal, which is configured to drive the device to emit light by using a voltage from the first voltage terminal, and provide a coupling capacitance to acquire fingerprint information. The
(Continued)

fingerprint information output sub-circuit is coupled to the anode, a third signal terminal and a signal reading line, which is configured to output a signal acquired at the anode as the information to the line under control of a signal from the third signal terminal.

14 Claims, 11 Drawing Sheets

(56) References Cited

U.S. PATENT DOCUMENTS

| | | |
|---|---|---|
| 2014/0266262 A1 | 9/2014 | Taghibakhsh |
| 2016/0253541 A1 | 9/2016 | Yang et al. |
| 2016/0260380 A1* | 9/2016 | Yang .................. G09G 3/32 |
| 2017/0046006 A1* | 2/2017 | Kim .................. G02F 1/13338 |
| 2017/0103706 A1 | 4/2017 | Yang et al. |
| 2018/0219049 A1 | 8/2018 | Zhu |
| 2019/0325189 A1 | 10/2019 | Sun et al. |

FOREIGN PATENT DOCUMENTS

| | | |
|---|---|---|
| CN | 104282265 A | 1/2015 |
| CN | 104778923 A | 7/2015 |
| CN | 105355171 A | 2/2016 |
| CN | 106098736 A | 11/2016 |
| CN | 106406622 A | 2/2017 |
| CN | 107039002 A | 8/2017 |
| KR | 10-2008-0001954 A | 1/2008 |

OTHER PUBLICATIONS

First Office Action issued in corresponding Chinese Application No. 201710417082.3, dated Nov. 2, 2018, with English translation.
Second Office Action issued in corresponding Chinese Application No. 201710417082.3, dated May 13, 2019, with English translation.

* cited by examiner

PIXEL CIRCUIT AND DISPLAY PANEL

CROSS-REFERENCE TO RELATED APPLICATION

This application is a national phase entry under 35 USC 371 of International Patent Application No. PCT/CN2018/089033 filed on May 30, 2018, which claims priority to Chinese Patent Application No. 201710417082.3, filed with the Chinese Patent Office on Jun. 5, 2017, titled "PIXEL CIRCUIT AND DISPLAY DEVICE", which are incorporated herein by reference in their entirety.

TECHNICAL FIELD

The present disclosure relates to the field of display technologies, and in particular, to a pixel circuit and a display panel.

BACKGROUND

OLED displays have advantages of low manufacturing cost, high response speed, power saving, direct current (DC) drive for portable devices, large operating temperature range, etc., and are expected to become a next generation of new flat panel displays replacing liquid crystal displays (LCDs).

With continuous developments of display technologies, in addition to a display function, a display device may realize more and more personalized functions, such as online social communications and electronic commerces. In order to protect personal information stored and used in the display device, it is required that the display device may first identify and authenticate an identity of a user before the user uses the display device. For example, a privacy protection of information of the user is achieved through a fingerprint recognition.

SUMMARY

Some embodiments of the present disclosure provide a pixel circuit, and the pixel circuit includes a driving sub-circuit, a writing sub-circuit, a light-emitting device and a fingerprint information output sub-circuit. The writing sub-circuit is coupled to the driving sub-circuit, a first signal terminal and a data signal terminal, and the writing sub-circuit is configured to write a data signal from the data signal terminal to the driving sub-circuit under control of a signal from the first signal terminal. The driving sub-circuit is further coupled to an anode of the light-emitting device and a first voltage terminal, and the driving sub-circuit is configured to drive the light-emitting device to emit light by using a voltage from the first voltage terminal and provide a coupling capacitance to acquire fingerprint information. The fingerprint information output sub-circuit is coupled to the anode of the light-emitting device, a third signal terminal and a signal reading line, and the fingerprint information output sub-circuit is configured to output a signal acquired at the anode of the light-emitting device as the fingerprint information to the signal reading line under control of a signal from the third signal terminal.

In some embodiments, the driving sub-circuit includes a display driving sub-circuit and an acquisition sub-circuit. The display driving sub-circuit is coupled to the anode of the light-emitting device and the first voltage terminal, and the display driving sub-circuit is configured to drive the light-emitting device to emit light by using the voltage from the first voltage terminal. The acquisition sub-circuit is coupled to the display driving sub-circuit and a second signal terminal, and the acquisition sub-circuit is configured to acquire the fingerprint information under control of a signal from the second signal terminal and the display driving sub-circuit.

In some embodiments, the display driving sub-circuit includes a storage capacitor and a driving transistor. A gate of the driving transistor is coupled to the writing sub-circuit, a first electrode of the driving transistor is coupled to the first voltage terminal, and a second electrode of the driving transistor is coupled to the anode of the light-emitting device. One end of the storage capacitor is coupled to the first electrode of the driving transistor, and another end is coupled to the gate of the driving transistor.

In some embodiments, the acquisition sub-circuit includes an acquisition capacitor and a gating transistor. A gate of the gating transistor is coupled to the second signal terminal, a first electrode of the gating transistor is coupled to the display driving sub-circuit, and a second electrode of the gating transistor is coupled to one end of the acquisition capacitor. Another end of the acquisition capacitor is coupled to the anode of the light-emitting device. One end of both ends of the acquisition capacitor serves as an electrode for providing the coupling capacitance.

In some embodiments, the driving sub-circuit includes a driving transistor and a multiplex capacitor. A gate of the driving transistor is coupled to the writing sub-circuit, a first electrode of the driving transistor is coupled to the first voltage terminal, and a second electrode of the driving transistor is coupled to the anode of the light-emitting device. One end of the multiplex capacitor is coupled to the first electrode of the driving transistor, and another end is coupled to the gate of the driving transistor. One end of both ends of the multiplex capacitor serves as an electrode for providing the coupling capacitance.

In some embodiments, the fingerprint information output sub-circuit includes a second transistor. A gate of the second transistor is coupled to the third signal terminal, a first electrode of the second transistor is coupled to the anode of the light-emitting device, and a second electrode of the second transistor is coupled to the signal reading line.

The writing sub-circuit includes a first transistor. A gate of the first transistor is coupled to the first signal terminal, a first electrode of the first transistor is coupled to the data signal terminal, and a second electrode of the first transistor is coupled to the driving sub-circuit.

The pixel circuit provided by some embodiments of the present disclosure further includes a compensation sub-circuit and a reset sub-circuit. The compensation sub-circuit is coupled to the driving sub-circuit, a fourth signal terminal and a reference voltage terminal, and the compensation sub-circuit is configured to compensate a threshold voltage of the driving sub-circuit by using a voltage from the reference voltage terminal under control of a signal from the fourth signal terminal. The reset sub-circuit is coupled to the light-emitting device, a fifth signal terminal and the reference voltage terminal, and the reset sub-circuit is configured to reset a potential on the anode of the light-emitting device by using the voltage from the reference voltage terminal under control of a signal from the fifth signal terminal.

In some embodiments, the pixel circuit further includes an enabling light-emitting sub-circuit. The enabling light-emitting sub-circuit is coupled to the driving sub-circuit, the anode of the light-emitting device and a sixth signal terminal, and the enabling light-emitting sub-circuit is configured to enable the driving sub-circuit to drive the light-emitting device to emit light under control of a signal from the sixth signal terminal.

In some embodiments, the compensation sub-circuit includes a third transistor. A gate of the third transistor is coupled to the fourth signal terminal, a first electrode of the third transistor is coupled to the reference voltage terminal, and a second electrode of the third transistor is coupled to the driving sub-circuit.

The reset sub-circuit includes a fourth transistor. A gate of the fourth transistor is coupled to the fifth signal terminal, a first electrode of the fourth transistor is coupled to the reference voltage terminal, and a second electrode of the fourth transistor is coupled to the anode of the light-emitting device.

The enabling light-emitting sub-circuit includes a fifth transistor and a sixth transistor. A gate of the fifth transistor is coupled to the sixth signal terminal, a first electrode of the fifth transistor is coupled to the the first voltage terminal, and a second electrode of the fifth transistor is coupled to the driving sub-circuit. A gate of the sixth transistor is coupled to the sixth signal terminal, a first electrode of the sixth transistor is coupled to the driving sub-circuit, and a second electrode of the sixth transistor is coupled to the anode of the light-emitting device.

Some embodiments of the present disclosure provide a display panel including a TFT backplane, and the TFT backplane includes pixel circuits described above.

In some embodiments, the TFT backplane further includes a pixel defining layer and a cathode layer disposed on a surface of the pixel defining layer away from the pixel circuits. Each pixel circuit includes an acquisition capacitor, and through hole(s) are provided in the pixel defining layer, at least one of the through hole(s) corresponds to an acquisition capacitor. Opening(s) are provided in the cathode layer. Each opening is directly opposite to a corresponding through hole in a direction perpendicular to the cathode layer.

In some embodiments, each through hole corresponds to an acquisition capacitor. A cross-section of the through hole in a direction perpendicular to the cathode layer has a shape of a trapezoid, and an upper bottom of the trapezoid is located in a surface of the pixel defining layer close to the cathode layer. The TFT backplane further includes island electrode(s), each island electrode is disposed on an electrode of a corresponding acquisition capacitor close to the cathode layer, and is disposed in a corresponding through hole. The island electrode is insulated from the cathode layer, and the island electrode and the cathode layer are made of a same material.

In some embodiments, an orthographic projection of an upper opening of each through hole on a plane where the acquisition capacitor is located is within a range of an orthographic projection of a corresponding opening of the cathode layer on the plane.

In some embodiments, the display panel further includes a metal shielding film disposed on a side of the TFT backplane away from a display surface, and a touch hole is provided in the metal shielding film. Each pixel circuit includes a multiplex capacitor, and an orthographic projection of the multiplex capacitor on the metal shielding film is located in the touch hole.

DETAILED DESCRIPTION

The technical solutions in embodiments of the present disclosure will be described clearly and completely with reference to the accompanying drawings in the embodiments of the present disclosure. Obviously, the described embodiments are merely some but not all of the embodiments of the present disclosure. All other embodiments made on the basis of the embodiments of the present disclosure by a person of ordinary skill in the art without paying any creative effort shall be included in the protection scope of the present disclosure.

In the related art, a fingerprint recognition device of a display device such as a mobile phone is usually disposed at a position where a function button outside a display area of the display device is located, and the fingerprint recognition is performed by placing a finger on the function button.

Figure 1:
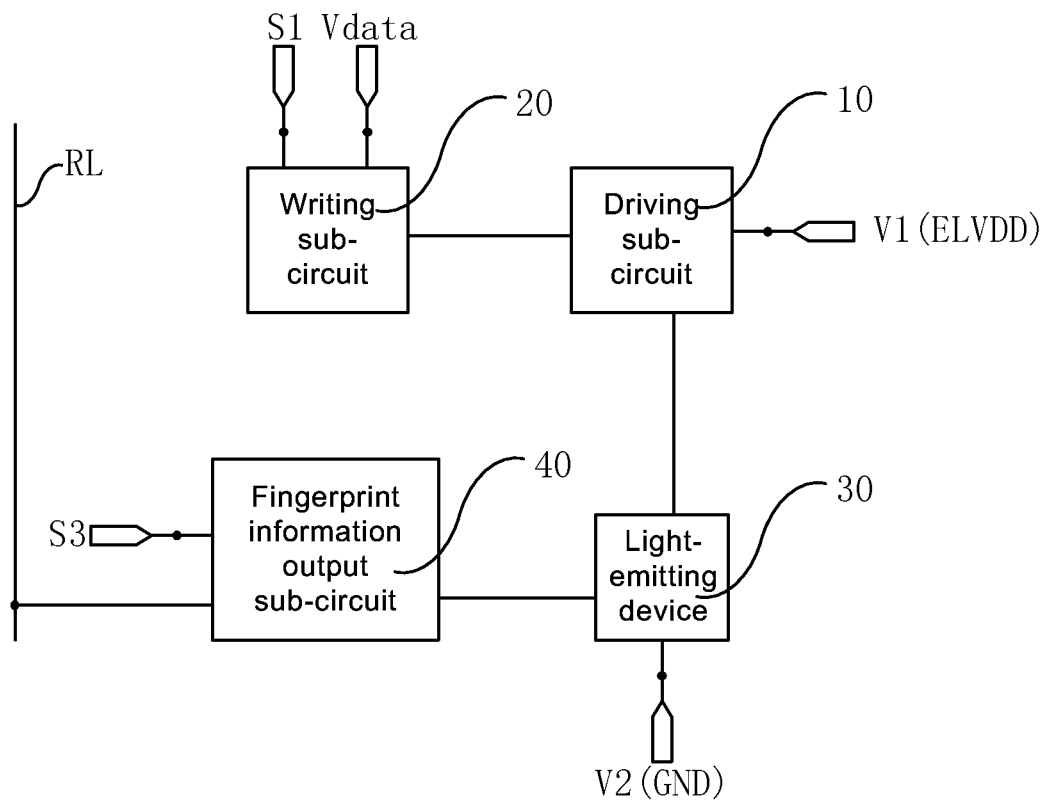
FIG. 1 is a schematic structural diagram of a pixel circuit, in accordance with some embodiments of the present disclosure.

Some embodiments of the present disclosure provide a pixel circuit. As shown in FIG. 1, the pixel circuit includes a driving sub-circuit 10, a writing sub-circuit 20, a light-emitting device 30 and a fingerprint information output sub-circuit 40.

The writing sub-circuit 20 is coupled to the driving sub-circuit 10, a first signal terminal S1 and a data signal terminal Vdata, and the writing sub-circuit 20 is configured to write a data signal from the data signal terminal Vdata to the driving sub-circuit 10 under control of a signal from the first signal terminal S1.

The driving sub-circuit 10 is further coupled to an anode of the light-emitting device 30 and a first voltage terminal V1, and the driving sub-circuit 10 is configured to drive the light-emitting device 30 to emit light by using a voltage from the first voltage terminal V1 and provide a coupling capacitance to acquire fingerprint information.

A cathode of the light-emitting device 30 is coupled to a second voltage terminal V2.

The fingerprint information output sub-circuit 40 is coupled to the anode of the light-emitting device 30, a third signal terminal S3 and a signal reading line RL, and the fingerprint information output sub-circuit 40 is configured to output a signal acquired at the anode of the light-emitting device 30 as the fingerprint information to the signal reading line RL under control of a signal from the third signal terminal S3.

In some embodiments, as shown in FIG. 1, the first voltage terminal V1 is a supply voltage terminal ELVDD, and the second voltage terminal V2 is a common ground terminal GND. The pixel circuit will be described below by taking this configuration as an example.

In some embodiments of the present disclosure, an acquisition of the fingerprint information depends on a value of a coupling capacitance formed between a ridge line or a valley line of a fingerprint and an electrode plate of a capacitor, and is achieved by acquiring a coupling capacitance at each position of the ridge line or the valley line.

In the pixel circuit provided by the embodiments of the present disclosure, the light-emitting device may be driven to emit light under control of a voltage from the first voltage terminal by setting the driving sub-circuit. Moreover, when the coupling capacitance is formed between a fingerprint of a finger and an electrode of a capacitor of the driving sub-circuit, the fingerprint information is acquired in accordance with the coupling capacitance to output the acquired fingerprint information by the fingerprint information output sub-circuit to the signal reading line under control of a signal from the third signal terminal. Therefore, in a case of a normal display of a display panel, the fingerprint information may be directly acquired and output in a display area of the display panel. In this way, it is not necessary to separately provide a fingerprint acquisition component and a fingerprint acquisition circuit in the display panel, thereby increasing an area of the display area of the display panel and facilitating achieving a narrow bezel of the display panel.

Figure 2:
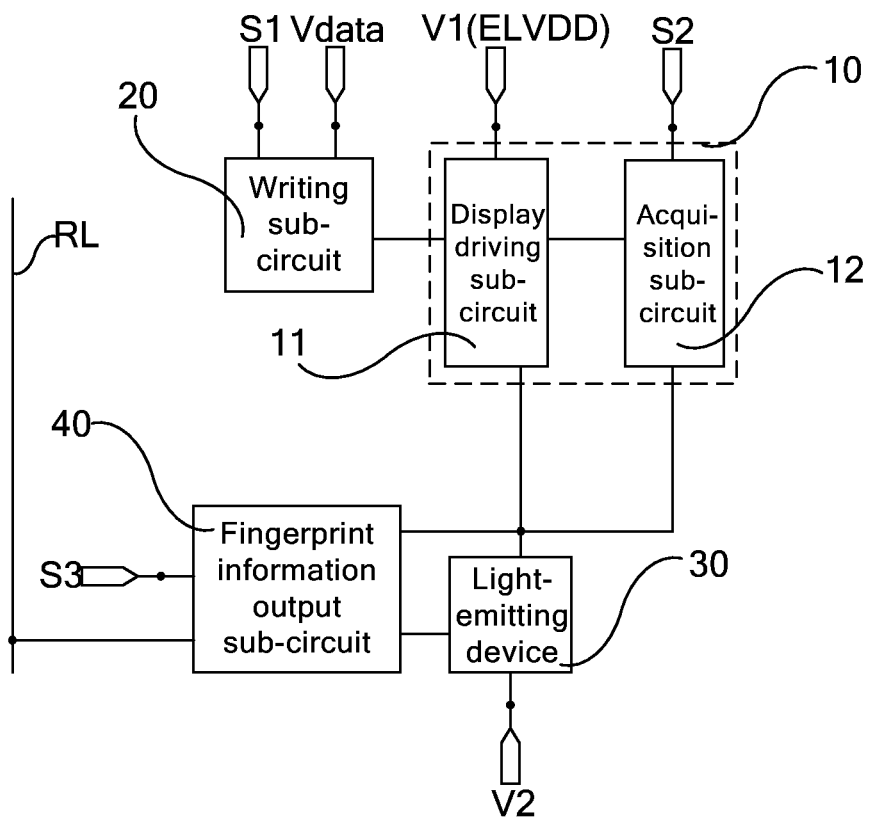
FIG. 2 is a schematic structural diagram of a driving sub-circuit of the pixel circuit shown in FIG. 1, in accordance with some embodiments of the present disclosure.

In some embodiments of the present disclosure, as shown in FIG. 2, the driving sub-circuit 10 includes a display driving sub-circuit 11 and an acquisition sub-circuit 12.

The display driving sub-circuit 11 is coupled to the anode of the light-emitting device 30 and the first voltage terminal V1, and the display driving sub-circuit 11 is configured to drive the light-emitting device 30 to emit light by using the voltage from the first voltage terminal V1.

The acquisition sub-circuit 12 is coupled to the display driving sub-circuit 11 and a second signal terminal S2, and the acquisition sub-circuit 12 is configured to acquire the fingerprint information under control of a signal from the second signal terminal S2 and the display driving sub-circuit 11.

Figure 3:
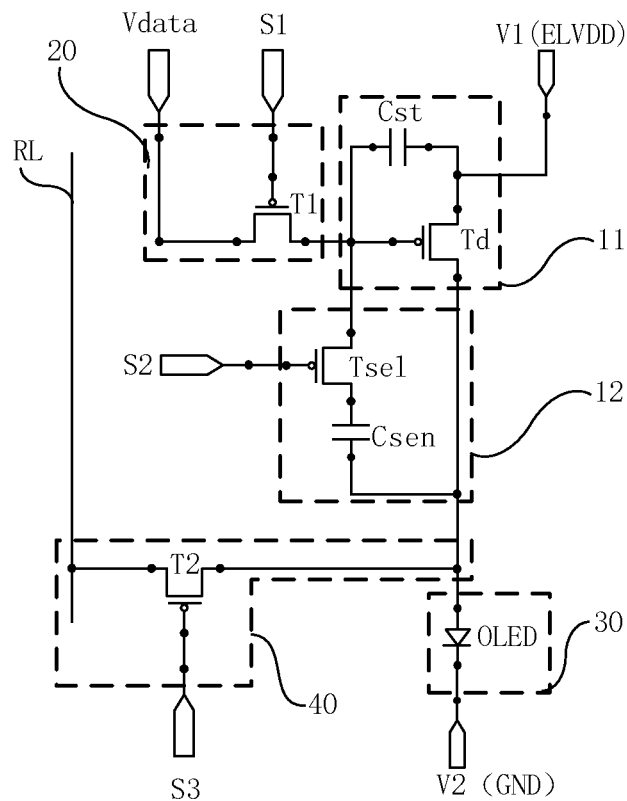
FIG. 3 is a schematic structural diagram of various sub-circuits of the pixel circuit shown in FIG. 2, in accordance with some embodiments of the present disclosure.

In some embodiments, as shown in FIG. 3, the display driving sub-circuit 11 includes a storage capacitor Cst and a driving transistor Td.

The driving transistor Td includes a gate, a first electrode and a second electrode. The gate is coupled to the writing sub-circuit 20, the first electrode is coupled to the first voltage terminal V1, and the second electrode is coupled to the anode of the light-emitting device 30. One end of the storage capacitor Cst is coupled to the first electrode of the driving transistor Td, and another end is coupled to the gate of the driving transistor Td.

In some embodiments, as shown in FIG. 3, the acquisition sub-circuit 12 includes an acquisition capacitor Csen and a gating transistor Tsel.

The gating transistor Tsel includes a gate, a first electrode and a second electrode. The gate is coupled to the second signal terminal S2, the first electrode is coupled to the display driving sub-circuit 11, and the second electrode is coupled to one end of the acquisition capacitor Csen. Another end of the acquisition capacitor Csen is coupled to the anode of the light-emitting device 30. One end of both ends of the acquisition capacitor Csen serves as an electrode for providing a coupling capacitance, and a human finger serves as another electrode for providing the coupling capacitance.

In a case where the display driving sub-circuit 11 includes the storage capacitor Cst and the driving transistor Td, the first electrode of the gating transistor Tsel is coupled to the gate of the driving transistor Td in the display driving sub-circuit 11.

It will be noted that, the coupling capacitance refers to a capacitance generated between a human finger and an electrode plate of the acquisition capacitor Csen close to the finger when the human finger is in contact with the display panel.

In some embodiments, the display driving sub-circuit 11 further includes a plurality of driving transistors Td coupled in parallel. In some other embodiments, the display driving sub-circuit 11 further includes a capacitor, one end of which is coupled to the gate of the driving transistor Td, and another end of which is coupled to a first electrode of the driving transistor Td. The foregoing descriptions are merely examples of the display driving sub-circuit 11. Other structures having a same function as the display driving sub-circuit 11 are not elaborated herein, but all shall be included in the protection scope of the present disclosure.

In some embodiments, the light-emitting device 30 includes a current-driven light-emitting device such as a light-emitting diode (LED) or an organic light-emitting diode (OLED). The pixel circuit will be described by taking an example in which the light-emitting device 30 is an OLED below. Other structures having the same function as the light-emitting device 30 are not elaborated herein, but all shall be included in the protection scope of the present disclosure.

In some embodiments, as shown in FIG. 3, the fingerprint information output sub-circuit 40 includes a second transistor T2. The second transistor T2 includes a gate, a first electrode and a second electrode, and the gate of the second transistor T2 is coupled to the third signal terminal S3, the first electrode of the second transistor T2 is coupled to the anode of the light-emitting device 30, and the second electrode of the second transistor T2 is coupled to the signal reading line RL.

In some embodiments, as shown in FIG. 3, the writing sub-circuit 20 includes a first transistor T1. The first transistor T1 includes a gate, a first electrode and a second electrode. The gate of the first transistor T1 is coupled to the first signal terminal S1, the first electrode of the first transistor T1 is coupled to the data signal terminal Vdata, and the second electrode of the first transistor T1 is coupled to the driving sub-circuit 10.

In a case where the driving sub-circuit 10 includes the driving transistor Td, the second electrode of the first transistor T1 is coupled to the gate of the driving transistor Td.

It will be noted that the present disclosure does not limit first electrodes and second electrodes of remaining transistors (all of which are switching transistors) other than the driving transistor Td. In some embodiments, the first electrodes are drains and the second electrodes are sources. In some other embodiments, the first electrodes are the sources and the second electrodes are the drains. In some embodiments, the driving transistor Td is a P-type transistor. Since a source voltage of the P-type transistor is higher than a drain voltage, the first electrode of the driving transistor Td is the source and the second electrode of the driving transistor Td is the drain. In some other embodiments, the driving transistor Td is an N-type transistor. The first electrode of the driving transistor Td is the drain, and the second electrode of the driving transistor Td is the source.

Figure 4:
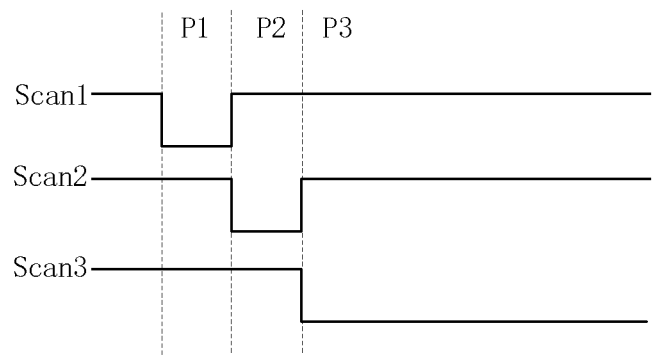
FIG. 4 is a diagram showing a timing of various control signals in a working process of the pixel circuit shown in FIG. 3.

In a case where all the transistors in FIG. 3 are P-type transistors, a working process of the pixel circuit shown in FIG. 3 is described in detail in combination with the timing diagram shown in FIG. 4.

Figure 5A:
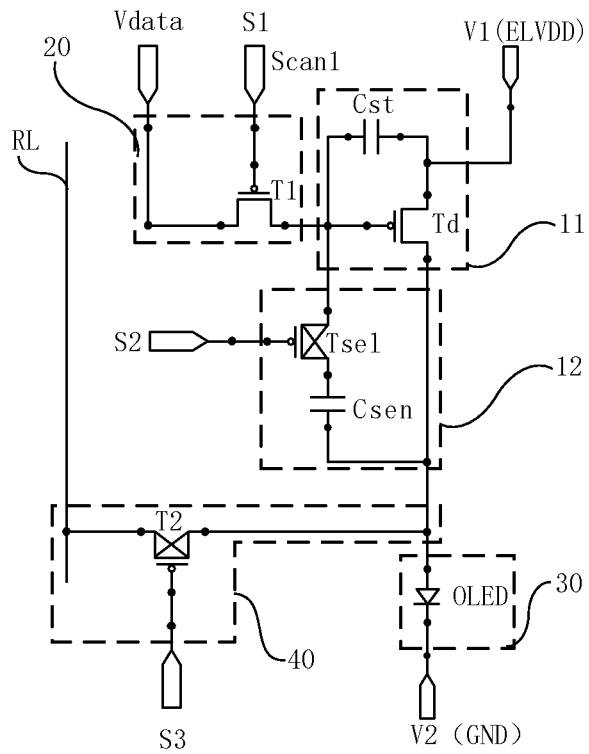
FIGS. 5a-5c are equivalent circuit diagrams of the pixel circuit shown in FIG. 3 respectively in periods P1-P3 in FIG. 4.

In a first period P1, an equivalent circuit diagram of the pixel circuit shown in FIG. 3 is as shown in FIG. 5a. In all equivalent circuit diagrams, transistors in an off state are indicated by a symbol "x".

A signal from a first scanning signal line Scan1 is input to the first signal terminal S1, and the first transistor T1 is turned on. A data signal from a data voltage terminal Vdata is written to the driving transistor Td through the first transistor T1 to turn on the driving transistor Td. Moreover, the data signal from the data voltage terminal Vdata charges the storage capacitor Cst. The cathode of the light-emitting device 30 is coupled to the second voltage terminal V2, and the second voltage terminal V2 is the common ground terminal GND. A supply voltage on the first voltage terminal V1 is transferred to the anode of the light-emitting device 30 through the driving transistor Td to drive the light-emitting device 30 to emit light.

Figure 5B:
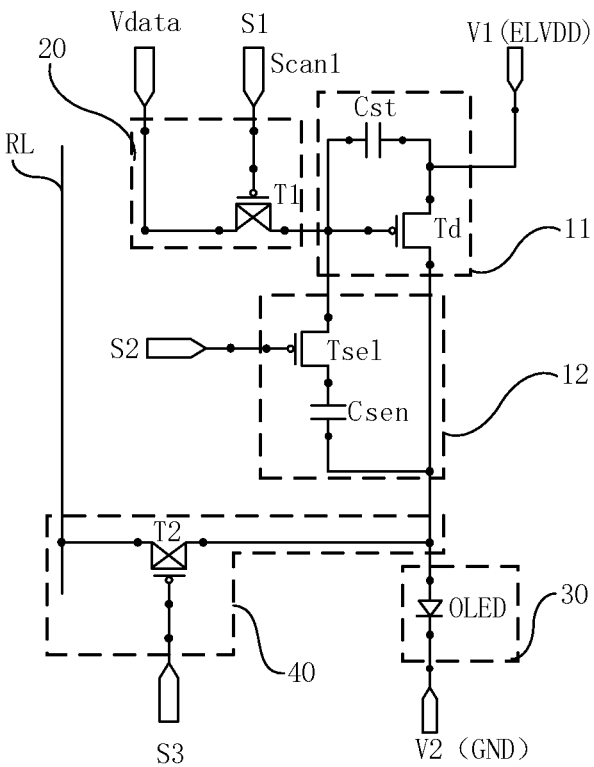

In a second period P2, the equivalent circuit diagram of the pixel circuit shown in FIG. 3 is as shown in FIG. 5b. A signal from a second scanning signal line Scan2 is input to the second signal terminal S2, so that the gating transistor Tsel is turned on. In this case, the storage capacitor Cst charged in the first period P1 is discharged to keep the driving transistor Td in an on state, thereby maintaining a continuous light emission of the light-emitting device 30.

In the second period P2, if a human finger is in contact with the display panel, coupling capacitances will be generated between the finger and electrode plates of acquisition capacitors Csen close to the finger. The coupling capacitance affects a capacitance of the acquisition capacitor Csen, and a change in the capacitance of the acquisition capacitor Csen affects a potential on the anode of the light-emitting device 30. Relative to the ridge line of a fingerprint, the valley line of the fingerprint is farther away from the electrode plate of the acquisition capacitor Csen close to the finger. A coupling capacitance formed between the valley line of the fingerprint and the electrode plate of the acquisition capacitor Csen close to the finger is smaller, and the capacitance of the acquisition capacitor Csen itself is also smaller. In this case, if a certain acquisition capacitor Csen corresponds to the valley line of the fingerprint, a current measured at the anode of the light-emitting device 30 corresponding to the certain acquisition capacitor Csen may be regarded as an initial current. However, the ridge line of the fingerprint is closer to the electrode plate of the acquisition capacitor Csen close to the finger, a coupling capacitance formed between the ridge line of the fingerprint and the electrode plate of the acquisition capacitor Csen close to the finger is larger, and an addition of the coupling capacitance causes the capacitance of the acquisition capacitor Csen to increase. In this case, if a certain acquisition capacitor Csen corresponds to the ridge line of the fingerprint, the current measured at the anode of the light-emitting device 30 corresponding to the certain acquisition capacitor Csen will significantly increase. When the current acquired at the anode of the light-emitting device 30 is greater than the initial current, a position where the acquisition capacitor Csen is located is a position where the ridge line of the fingerprint are located. Similarly, when the initial current is acquired at the anode of the light-emitting device 30, the position where the acquisition capacitor Csen is located is a position where the valley line of the fingerprint is located, thereby completing the acquisition of the fingerprint information.

Figure 5C:
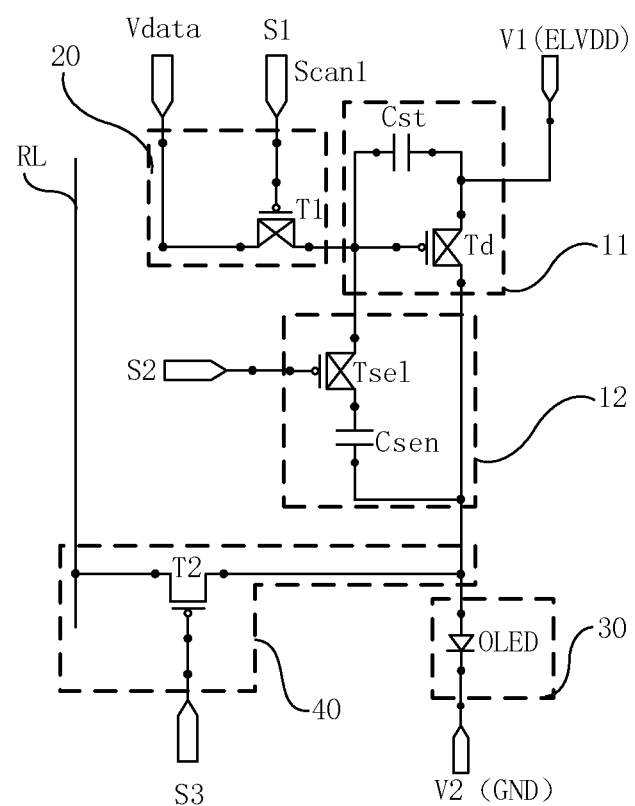

In a third period P3, the equivalent circuit diagram of the pixel circuit shown in FIG. 3 is as shown in FIG. 5c. A signal is input to the third signal terminal S3 through a third scanning signal line Scan3, so that the second transistor T2 is turned on, and the fingerprint information acquired at the anode of the light-emitting device 30 is transferred to the signal reading line RL through the second transistor T2.

Figure 6:
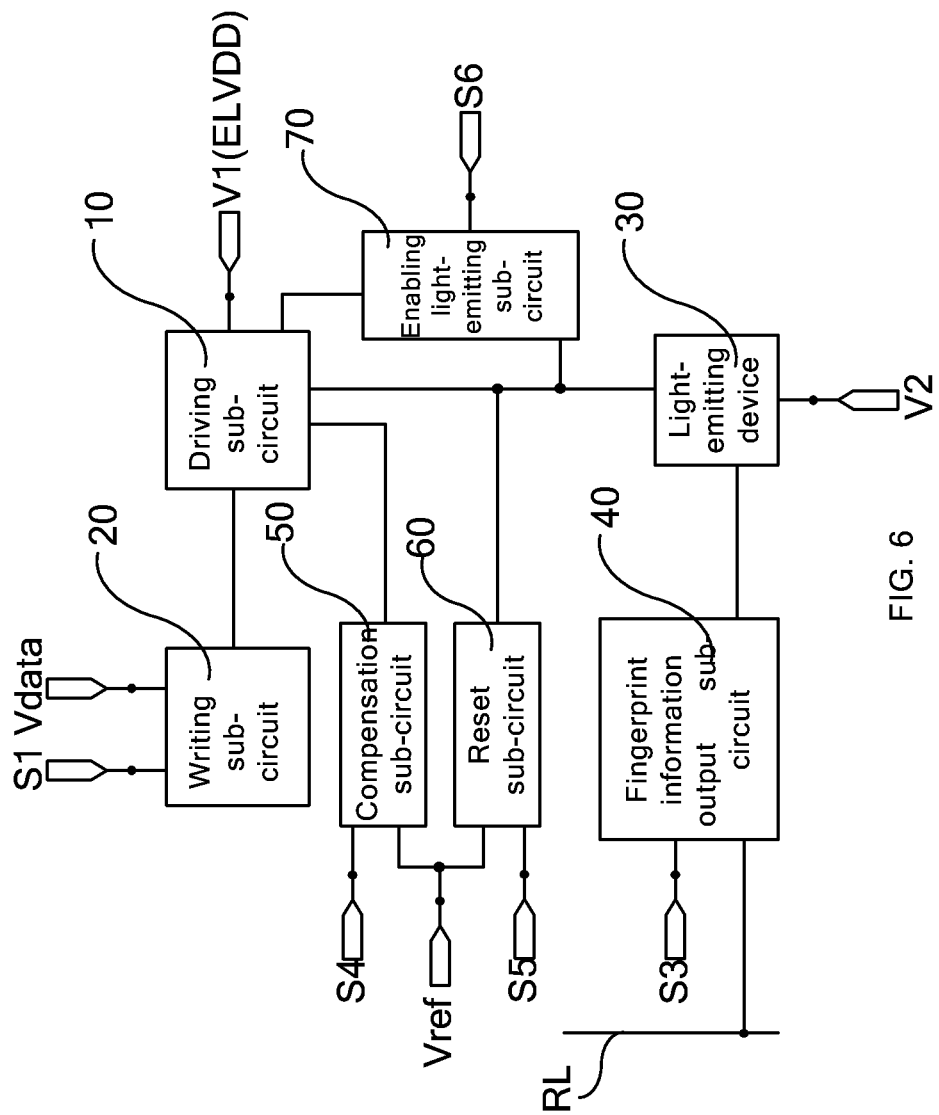
FIG. 6 is a schematic structural diagram of a pixel circuit further including a compensation sub-circuit, a reset sub-circuit and an enabling light-emitting sub-circuit, in accordance with some embodiments of the present disclosure.

In some embodiments, as shown in FIG. 6, the pixel circuit further includes a compensation sub-circuit 50 and a reset sub-circuit 60.

The compensation sub-circuit 50 is coupled to the driving sub-circuit 10, a fourth signal terminal S4 and a reference voltage terminal Vref, and the compensation sub-circuit 50 is configured to compensate a threshold voltage Vth of the driving sub-circuit 10 by using a voltage from the reference voltage terminal Vref under control of a signal from the fourth signal terminal S4.

The reset sub-circuit 60 is coupled to the light-emitting device 30, a fifth signal terminal S5 and the reference voltage terminal Vref, and the reset sub-circuit 60 is configured to reset a potential on the anode of the light-emitting device 30 by using the voltage from the reference voltage terminal Vref under control of a signal from the fifth signal terminal S5.

In some embodiments, as shown in FIG. 6, the pixel circuit further includes an enabling light-emitting sub-circuit 70.

The enabling light-emitting sub-circuit 70 is coupled to the driving sub-circuit 10, the anode of the light-emitting device 30 and a sixth signal terminal S6, and the enabling light-emitting sub-circuit 70 is configured to enable the driving sub-circuit 10 to drive the light-emitting device 30 to emit light under control of a signal from the sixth signal terminal S6.

In this way, by providing the compensation sub-circuit 50 and the reset sub-circuit 60, the threshold voltage Vth of the driving sub-circuit 10 may be compensated by using the voltage from the reference voltage terminal Vref, and the potential on the anode of the light-emitting device 30 may be reset. Therefore, an adverse effect of a residual voltage remaining at the gate of the driving transistor Td during a display of a previous frame on a display of a present frame is avoided, and a residual potential remaining at the anode of the light-emitting device 30 is prevented from affecting an accuracy of the acquisition of the fingerprint information.

In addition, the enabling light-emitting sub-circuit 70 may control a driving capability of the driving sub-circuit 10 under the control of a signal from the sixth signal terminal S6, thereby avoiding an abnormal display of the light-emitting device 30 due to abnormal turning-ons of the transistors caused by the residual voltage, and further ensuring that the light-emitting device 30 emits light under driving of the driving sub-circuit 10.

Figure 7:
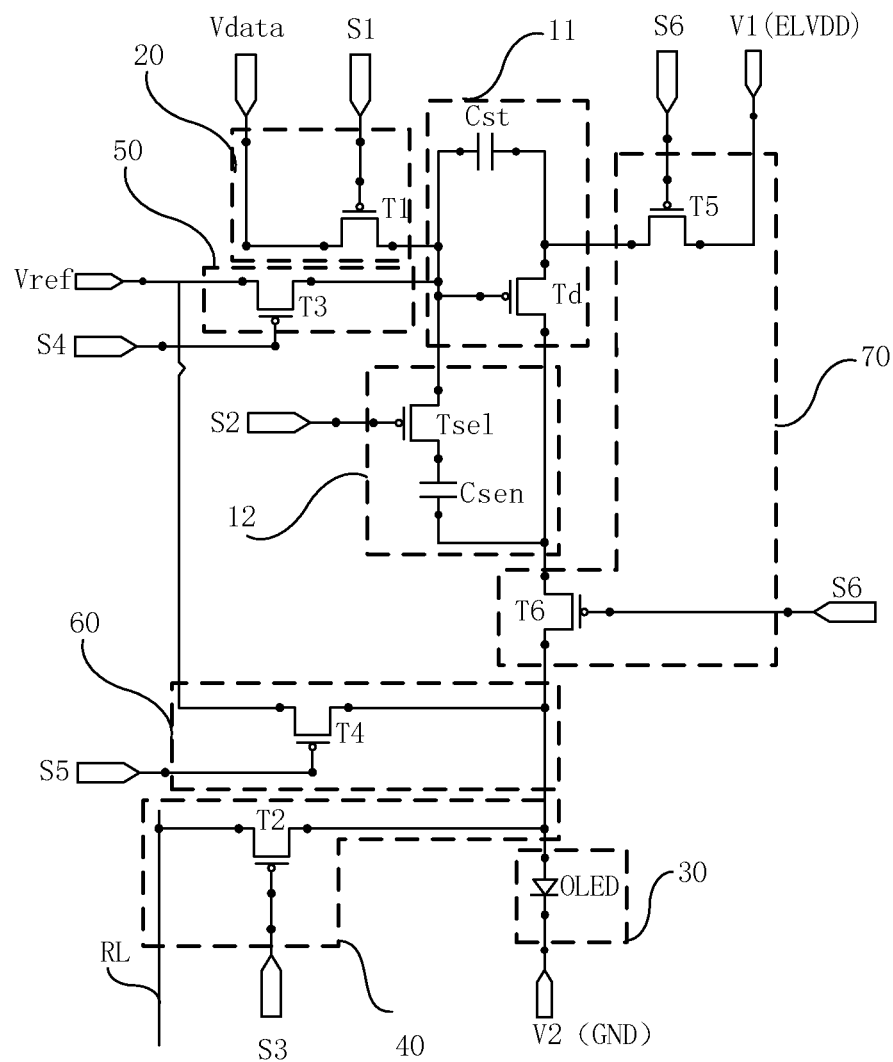
FIG. 7 is a schematic structural diagram of various sub-circuits of the pixel circuit shown in FIG. 6, in accordance with some embodiments of the present disclosure.

As shown in FIG. 7, structures of the compensation sub-circuit 50, the reset sub-circuit 60 and the enabling light-emitting sub-circuit 70 will be exemplified below.

In some embodiments, as shown in FIG. 7, the compensation sub-circuit 50 includes a third transistor T3.

The third transistor T3 includes a gate, a first electrode and a second electrode. The gate of the third transistor T3 is coupled to the fourth signal terminal S4, the first electrode of the third transistor T3 is coupled to the reference voltage terminal Vref, and the second electrode of the third transistor T3 is coupled to the driving sub-circuit 10.

In a case where the driving sub-circuit 10 includes the driving transistor Td, the second electrode of the third transistor T3 is coupled to the gate of the driving transistor Td.

In some embodiments, as shown in FIG. 7, the reset sub-circuit 60 includes a fourth transistor T4.

The fourth transistor T4 includes a gate, a first electrode and a second electrode. The gate of the fourth transistor T4 is coupled to the fifth signal terminal S5, the first electrode of the fourth transistor T4 is coupled to the reference voltage terminal Vref, and the second electrode of the fourth transistor T4 is coupled to the anode of the light-emitting device 30.

In some embodiments, as shown in FIG. 7, the enabling light-emitting sub-circuit 70 includes a fifth transistor T5 and a sixth transistor T6.

The fifth transistor T5 includes a gate, a first electrode and a second electrode. The gate of the fifth transistor T5 is coupled to the sixth signal terminal S6, the first electrode of the fifth transistor T5 is coupled to the first voltage terminal S1, and the second electrode of the fifth transistor T5 is coupled to the driving sub-circuit 10. The sixth transistor T6 includes a gate, a first electrode and a second electrode. The gate of the sixth transistor T6 is coupled to the sixth signal terminal S6, the first electrode of the sixth transistor T6 is coupled to the driving sub-circuit 10, and the second electrode of the sixth transistor T6 is coupled to the anode of the light-emitting device 30.

In a case where the driving sub-circuit 10 includes the driving transistor Td, the second electrode of the fifth transistor T5 is coupled to the first electrode of the driving transistor Td and the first electrode of the sixth transistor T6 is coupled to the second electrode of the driving transistor Td.

In some embodiments, all of the transistors in FIG. 7 are P-type transistors. In this case, working processes of the compensation sub-circuit 50, the reset sub-circuit 60 and the enabling light-emitting sub-circuit 70 in the pixel circuit shown in FIG. 7 will be exemplified in combination with the timing diagram shown in FIG. 8.

In a fourth period P4, as shown in FIG. 7, a signal from a fourth scanning signal line Scan4 is input to the fourth signal terminal S4, so that the third transistor T3 is turned on. The threshold voltage Vth of the driving transistor Td is compensated by using a reference voltage from the reference voltage terminal Vref through the third transistor T3.

In a fifth period P5, as shown in FIG. 7, a signal from a fifth scanning signal line Scan5 is input to the fifth signal terminal S5, so that the fourth transistor T4 is turned on. The potential on the anode of the light-emitting device 30 is reset by using the reference voltage from the reference voltage terminal Vref through the fourth transistor T4.

In a sixth period P6, as shown in FIG. 7, a signal from a sixth scanning signal line Scan6 is input to the sixth signal terminal S6, so that the fifth transistor T5 and the sixth transistor T6 are turned on. The supply voltage from the first voltage terminal V1 may be transferred to the anode of the light-emitting device 30 under the driving of the driving sub-circuit 10 to drive the light-emitting device 30 to emit light.

It will be noted that, the fourth period P4, the fifth period P5 and the sixth period P6 described above are not limited to the timing shown in FIG. 8. In some embodiments, the signals are simultaneously input to the fourth signal terminal S4 and the fifth signal terminal S5 to simultaneously achieve a compensation operation of the fourth period P4 and a reset operation of the fifth period P5.

In some embodiments, in the sixth period P6, the signal from the sixth scanning signal line Scan6 is input to the sixth signal terminal S6. Moreover, the signal from the first scanning signal line Scan1 is input to the first signal terminal S1 to write the data signal from the data voltage terminal Vdata to the driving transistor Td, and to charge the storage capacitor Cst. Thereby, the light-emitting device 30 may be driven to emit light.

Each sub-circuit may be cooperatively designed in accordance with actual needs after determining a role played by each sub-circuit in the pixel circuit in the embodiments of the present disclosure when a corresponding signal is input, so as to achieve a corresponding work process of the pixel circuit. These designs shall be included in the protection scope of the present disclosure.

Figure 8:
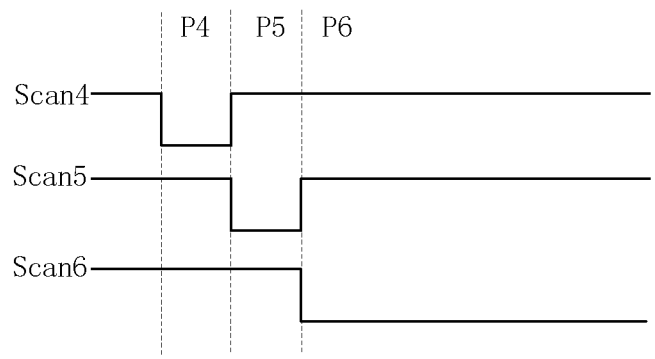
FIG. 8 is a diagram showing a timing of various control signals corresponding to the compensation sub-circuit, the reset sub-circuit and the enabling light-emitting sub-circuit in a working process of the pixel circuit shown in FIG. 7.

The above is described by taking an example where all the transistors in the pixel circuit are P-type transistors. In a case where all the transistors described above are N-type transistors, the timing signals in FIG. 4 and FIG. 8 are inverted (for example, in the first period P4 shown in FIG. 4, a high level is output from the first scanning signal line Scan1, a low level is output from both the second scanning signal line Scan2 and the third scanning signal line Scan3), and a working principle of the pixel circuit is the same as above, which are not described herein again.

Some embodiments of the present disclosure provide another pixel circuit different from the pixel circuit shown in FIG. 3, structures of the writing sub-circuit 20, the light-emitting device 30 and the fingerprint information output sub-circuit 40 in the another pixel circuit are the same as the structures described above. What is different is that, as shown in FIG. 9, the driving sub-circuit 10 includes the driving transistor Td and a multiplex capacitor Cd.

The driving transistor Td includes a gate, a first electrode and a second electrode. The gate of the driving transistor Td is coupled to the writing sub-circuit 20, the first electrode of the driving transistor Td is coupled to the first voltage terminal V1, and the second electrode of the driving transistor Td is coupled to the anode of the light-emitting device 30. One end of the multiplex capacitor Cd is coupled to the first electrode of the driving transistor Td, and another end of the multiplex capacitor Cd is coupled to the gate of the driving transistor Td. One end of both ends of the multiplex capacitor Cd serves as an electrode for providing the coupling capacitance, and the finger serves as another electrode for providing the coupling capacitance.

In this way, the multiplex capacitor Cd is configured to drive the light-emitting device 30 to emit light as a storage capacitor. Besides, an electrode plate of the multiplex capacitor Cd is configured to form a coupling capacitance between the electrode plate of the multiplex capacitor Cd and a finger to achieve the acquisition of the fingerprint information by the pixel circuit.

Figure 9:
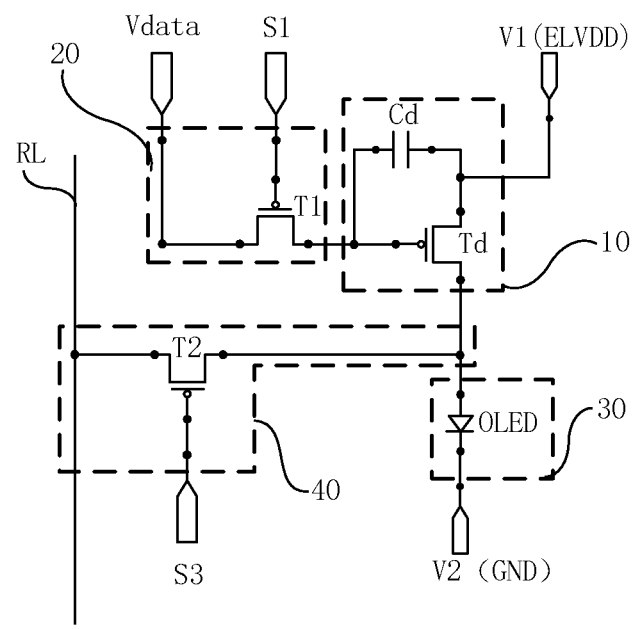
FIG. 9 is a schematic structural diagram of various sub-circuits of the pixel circuit shown in FIG. 1, in accordance with some embodiments of the present disclosure.
Figure 10:
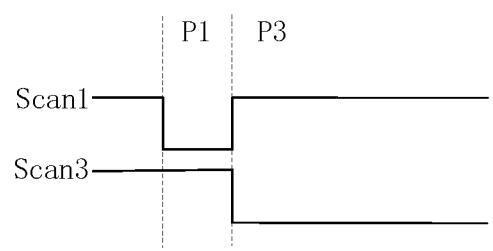
FIG. 10 is a diagram showing a timing of various control signals in a working process of the pixel circuit shown in FIG. 9.

In some embodiments, all the transistors in FIG. 9 are P-type transistors. In this case, a working process of the pixel circuit shown in FIG. 9 is exemplified in combination with the timing diagram shown in FIG. 10.

Figure 11A:
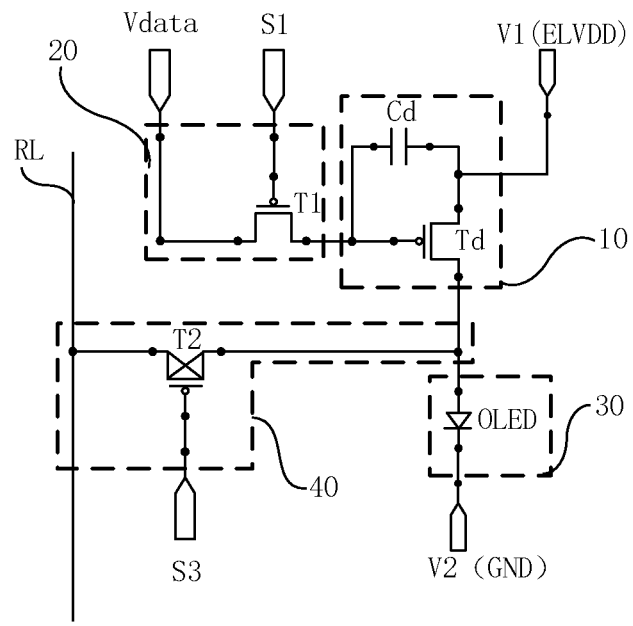
FIGS. 11a-11b are equivalent circuit diagrams of the pixel circuit shown in FIG. 9 respectively in periods P1-P3 in FIG. 10.

In the first period P1, the equivalent circuit diagram of the pixel circuit shown in FIG. 9 is as shown in FIG. 11a. The signal from the first scanning signal line Scan1 is input to the first signal terminal S1, so that the first transistor T1 is turned on. The data signal from the data voltage terminal Vdata is written to the driving transistor Td through the first transistor T1 to turn on the driving transistor Td. Moreover, the data signal from the data voltage terminal Vdata charges the multiplex capacitor Cd. The cathode of the light-emitting device 30 is coupled to the second voltage terminal V2, and the second voltage terminal V2 is the common ground terminal GND. The supply voltage from the first voltage terminal V1 is transferred to the anode of the light-emitting device 30 through the driving transistor Td to drive the light-emitting device 30 emit light.

In the first period P1, if a human finger is in contact with the display panel, coupling capacitances will be generated between the finger and electrode plates of multiplex capacitors Cd close to the finger, and the coupling capacitance affects a capacitance of the multiplex capacitor Cd. A change in the capacitance of the multiplex capacitor Cd affects the potential on the anode of the light-emitting device 30. Relative to the ridge line of a fingerprint, the valley line of the fingerprint is farther away from the electrode plate of the multiplex capacitor Cd close to the finger. A coupling capacitance formed between the valley line of the fingerprint and the electrode plate of the multiplex capacitor Cd close to the finger is smaller, in this case, if a certain multiplex capacitor Cd corresponds to the valley line of the fingerprint, and a current measured at the anode of the light-emitting device 30 corresponding to the certain multiplex capacitor Cd may be regarded as an initial current. However, the ridge line of the fingerprint is closer to the electrode plate of the multiplex capacitor Cd close to the finger, a coupling capacitance formed between the ridge line of the fingerprint and the electrode plate of the multiplex capacitor Cd close to the finger is larger, and an addition of the coupling capacitance causes the capacitance of the multiplex capacitor Cd to increase, in this case, if a certain multiplex capacitor Cd corresponds to the ridge line of the fingerprint, the current measured at the anode of the light-emitting device 30 corresponding to the certain multiplex capacitor Cd significantly increases. Therefore, when the current acquired at the anode of the light-emitting device 30 is greater than the initial current, the position where the multiplex capacitor Cd is located is the position where the ridge line of the fingerprint is located. Similarly, when the initial current is acquired at the anode of the light-emitting device 30, the position where the multiplex capacitor Cd is located is the position where the valley line of the fingerprint is located, so that the acquisition of the fingerprint information is completed while the multiplex capacitor Cd drives the light-emitting device 30 to emit light.

Figure 11B:
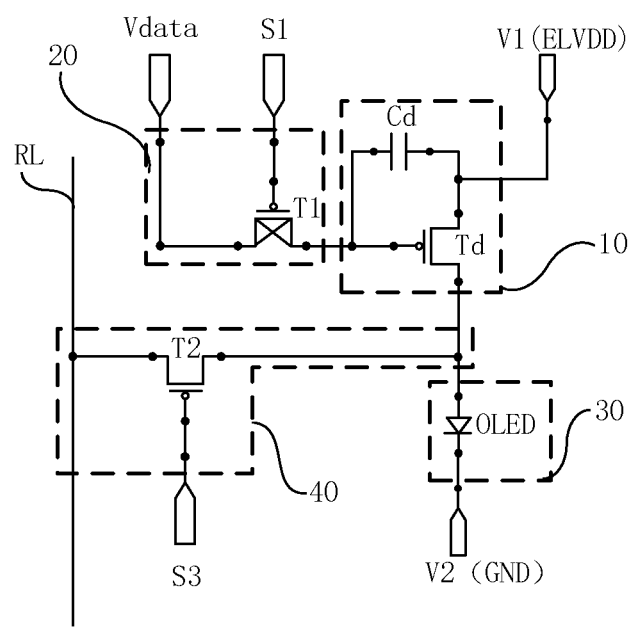

In the third period P3, the equivalent circuit diagram of the pixel circuit shown in FIG. 9 is as shown in FIG. 11b. The signal from the third scanning signal line Scan3 is input to the third signal terminal S3, so that the second transistor T2 is turned on, and the fingerprint information acquired at the anode of the light-emitting device 30 is transferred to the signal reading line RL through the second transistor T2.

In this way, by reusing the multiplex capacitor Cd in the driving sub-circuit 10, a circuit structure of the pixel circuit is further simplified on a basis that the light emission of the light-emitting device 30 and the acquisition and an output of the fingerprint information may be simultaneously achieved.

Similarly, in some embodiments, in order to compensate the threshold voltage Vth of the driving sub-circuit 10 in the pixel circuit shown in FIG. 9, reset the potential on the anode of the light-emitting device 30 and control the driving sub-circuit 10 to drive the light-emitting device 30 to emit light, the pixel circuit further includes the compensation sub-circuit 50, the reset sub-circuit 60 and the enabling light-emitting sub-circuit 70.

Here, a connection relationship among the compensation sub-circuit 50, the reset sub-circuit 60 and the enabling light-emitting sub-circuit 70 in the pixel circuit and functions thereof in the pixel circuit when the corresponding signals are input are the same as above, which are not described herein again.

Figure 13:
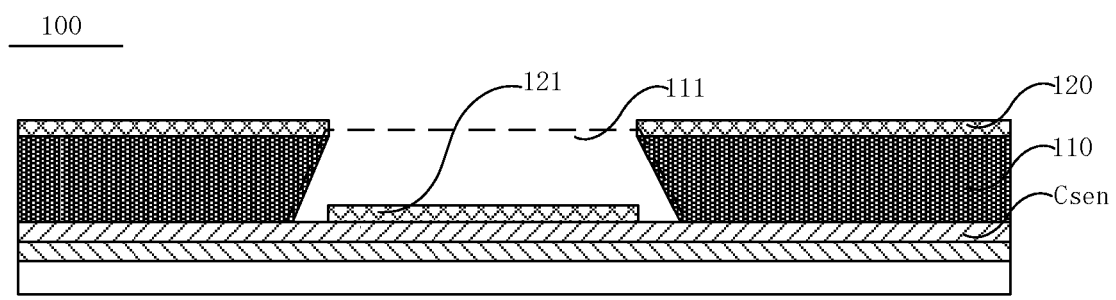
FIG. 13 is a schematic structural diagram of a portion of a display panel for fingerprint recognition through a display surface corresponding to an acquisition capacitor, in accordance with some embodiments of the present disclosure.
Figure 16:
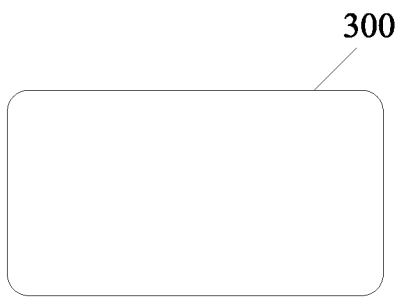
FIG. 16 is a schematic diagram of a display panel, in accordance with some embodiments of the present disclosure.

Some embodiments of the present disclosure provide a display panel. As shown in FIG. 13 and FIG. 16, the display panel 300 includes a TFT backplane 100, and the TFT backplane 100 has the pixel circuit described above.

In this way, the display panel 300 may acquire and output the fingerprints while the display of the display panel 100 is achieved to achieve a function of fingerprint recognition.

A human finger has a plurality of ridge lines and a plurality of valley lines, and each valley line is located between two adjacent ridge lines. Since information such as specific directions, lengths, and widths of ridge lines and valley lines of a finger of each person is different, the information constitutes specific fingerprint information of each person. When the human finger is placed on the display area of the display panel and is in contact with the display panel (that is, the human finger covers a portion of the display area of the display panel), the coupling capacitance is formed between the finger and an electrode of a capacitor in the driving sub-circuit 10 of the pixel circuit at a position covered by the finger. When a current read by the signal reading line RL in the pixel circuit is the initial current, the fingerprint information acquired at the position of the pixel circuit is the valley line of the fingerprint. When the current read by the signal reading line RL in the pixel circuit is significantly greater than the initial current, the fingerprint information acquired at the position of the pixel circuit is the ridge line of the fingerprint. Corresponding fingerprint information may be obtained by reading and sorting a fingerprint signal output by the signal reading line RL coupled to the pixel circuit at the position covered by the human finger. In some embodiments, preset fingerprint information is pre-stored in the display panel. In this case, the fingerprint information is recognized by the display panel by comparing the acquired fingerprint information with the preset fingerprint information.

Figure 12:
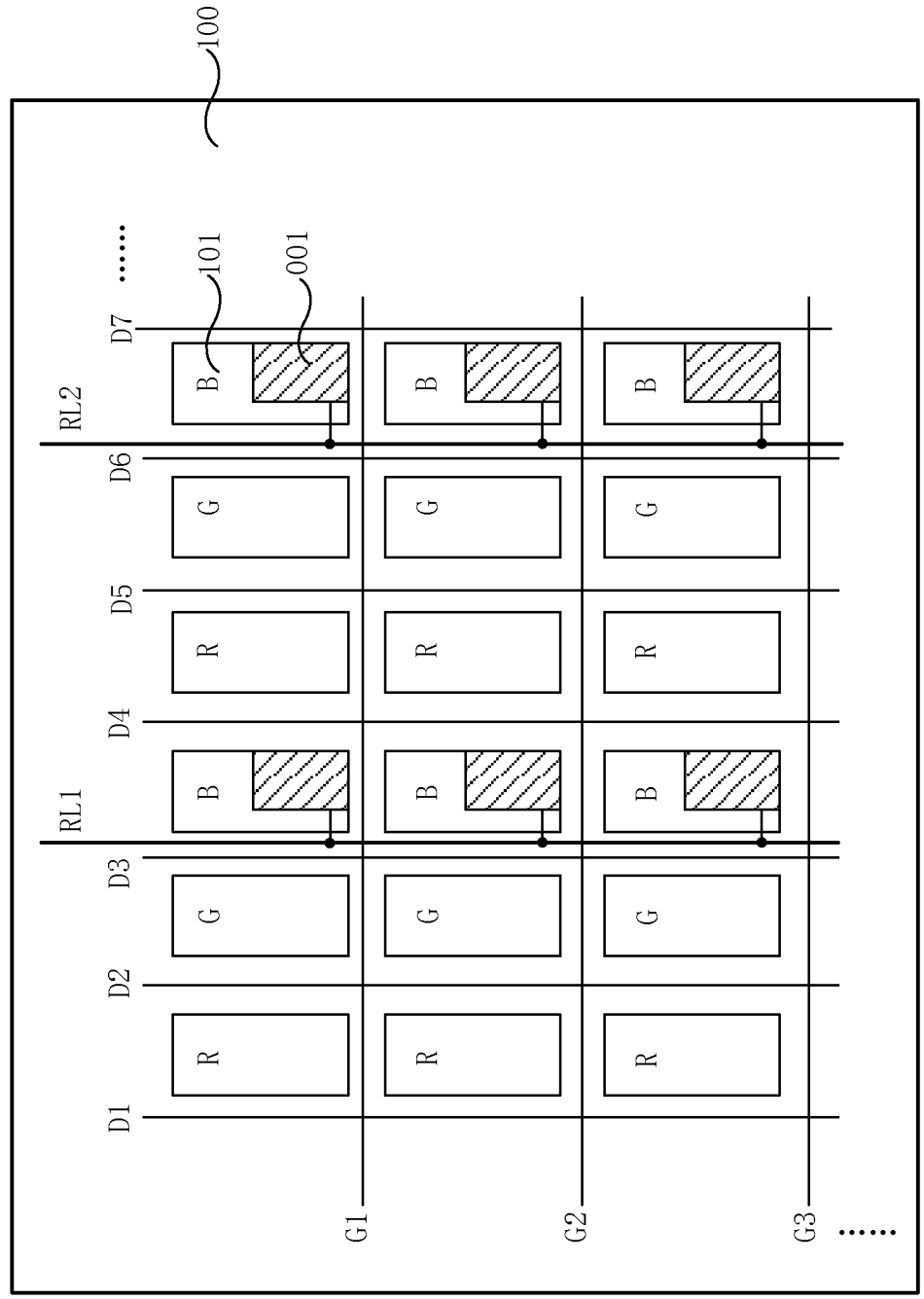
FIG. 12 is a schematic structural diagram of a display panel, in accordance with some embodiments of the present disclosure.

In some embodiments, the pixel circuit having fingerprint acquisition and recognition functions described above is provided in each sub-pixel unit. In some other embodiments, the pixel circuit having the fingerprint acquisition and recognition functions described above is provided in a portion of the sub-pixel units, as long as a spacing between two adjacent pixel circuits having the fingerprint acquisition and recognition functions is not more than 50 µm, and accuracies of the fingerprint acquisition and recognition may be ensured. In some embodiments, as shown in FIG. 12, the pixel circuit 001 having the fingerprint acquisition and recognition functions described above is provided in each blue sub-pixel unit 101 on the TFT backplane 100 to achieve the acquisition, output and recognition of the fingerprint information through information from a corresponding signal reading line RL In some other embodiments, the pixel circuit having the fingerprint acquisition and recognition functions described above is provided in a certain area or a plurality of areas in the display area of the display panel, so that the fingerprint acquisition and recognition may be achieved in a corresponding one or more areas in the display area. Of course, the foregoing is only descriptions of setting methods of the pixel circuit having the fingerprint acquisition and recognition functions in some embodiments of the present disclosure. Other setting methods are not described herein again, but all should be within the protection scope of the present disclosure.

The above display panel has same advantageous effects as the pixel circuit provided by the embodiments of the present disclosure. Since the pixel circuit has been described in detail in the foregoing embodiments, details are not described herein again.

In some embodiments, in a case where the display panel is used to perform the fingerprint acquisition in the display area of a display surface (i.e., an upper surface of the display panel in a state shown in FIG. 13), as shown in FIG. 13, the TFT backplane 100 further includes a pixel defining layer 110 and a cathode layer 120 disposed on the pixel defining layer 110. In some embodiments, the pixel circuit 001 includes the acquisition capacitor Csen, and through hole(s) 111 are disposed at a position corresponding to the acquisition capacitor Csen in the pixel defining layer 110. A longitudinal cross-section of the through hole 111 in a direction perpendicular to the cathode layer 120 has a shape of a trapezoid, and an upper edge of the trapezoid is located in a surface of the pixel defining layer 110 adjacent to the cathode layer 120. The TFT backplane further includes island electrode(s) 121, each island electrode is disposed on an electrode of the acquisition capacitor Csen adjacent to the cathode layer 120. The island electrode 121 is insulated from the cathode layer 120, and the island electrode 121 and the cathode layer 120 are made of a same material.

In some embodiments, the TFT backplane 100 includes a base, such as the lowest layer shown in FIG. 13, on which the pixel circuit 001 is disposed. The cathode layer 120 is disposed on a side of the pixel defining layer 110 away from the base. It will be noted that all the components of the pixel circuit 001 are not illustrated in FIG. 13.

The island electrode 121 is made of a same material as the cathode layer 120, that is, the island electrode 121 and the cathode layer 120 are formed through a single patterning process.

As shown in FIG. 13, the through hole 111 having a trapezoidal longitudinal cross-section is provided at the position corresponding to the acquisition capacitor Csen in the pixel defining layer 110. In this way, when the cathode layer 120 is formed on the pixel defining layer 110, since the upper edge of the trapezoidal shaped through hole 111 is located in the surface of the pixel defining layer 110 close to the cathode layer 120 to be formed, when a conductive layer is formed on a surface of the pixel defining layer 110 facing away from the acquisition capacitor Csen (that is, the conductive layer is a whole layer without any opening), each portion of the conductive layer having a same shape as the upper edge of the trapezoidal shaped through hole 111 drops to a lower edge of the trapezoidal shaped through hole 111 due to an action of the through hole 111. Therefore, portion(s) of the conductive layer that drop form the island electrode(s) 121, and the remaining portion of the conductive layer that contact with the surface of the pixel defining layer 110 facing away from the acquisition capacitor Csen forms the cathode layer 120, thereby removing a shielding effect of the cathode layer 120 on an entire surface of the display surface of the display panel at the position, so that the coupling capacitance is formed between the electrode plate of the acquisition capacitor Csen close to a finger and the finger. Therefore, the fingerprint information may be acquired and read when the finger is placed in the display area of the display surface while the display panel normally displays an image.

Figure 14:
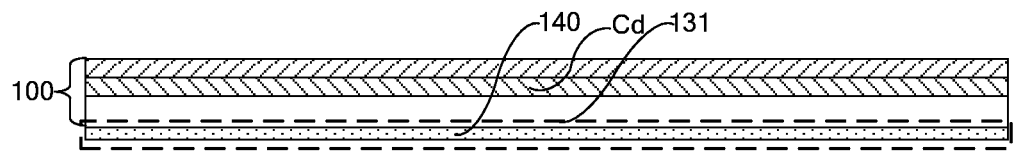
FIG. 14 is a schematic structural diagram of a portion of a display panel for fingerprint recognition though a back surface corresponding to a multiplex capacitor, in accordance with some embodiments of the present disclosure.
Figure 15:
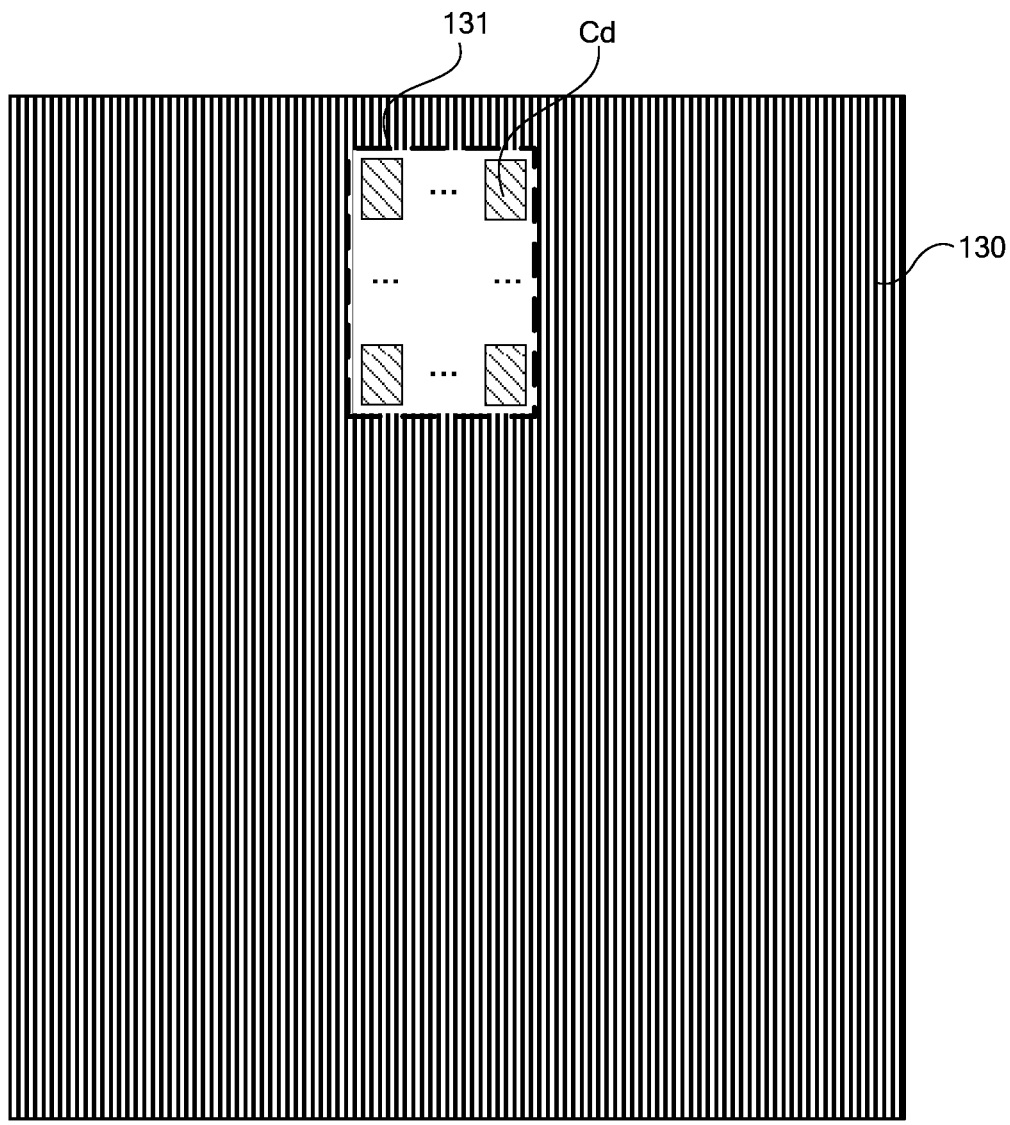
FIG. 15 is a schematic structural diagram of a display panel for fingerprint recognition through a back surface, in accordance with some embodiments of the present disclosure.

In some other embodiments, the display panel is configured to acquire the fingerprint on a back surface of the display area (a surface away from the display surface). As shown in FIG. 14, the display panel further includes a metal shielding film 130 disposed on a side of the TFT backplane 100 away from the display surface, and the metal shielding film 130 is provided with a touch hole 131. The pixel circuit 001 includes the multiplex capacitor Cd. As shown in FIG. 15, an orthographic projection of the multiplex capacitor Cd on the metal shielding film 130 is located in the touch hole 131 (in FIG. 15, in order to facilitate displaying a relative positional relationship, the TFT backplane 100, which is shown in FIG. 14, is omitted).

As shown in FIG. 14, since the metal shielding film 130 has the shielding effect on electrical signals, the metal shielding film 130 provided on the back surface of the display panel may shield impacts of various external electrical signals on the pixel circuit(s) 001 in the display panel. In a case where the touch hole 131 is disposed in the metal shielding film 130, and when the finger is placed at a position corresponding to the touch hole 131, since there is no shielding effect at the position, the coupling capacitances may exist between electrode plates of the multiplex capacitors Cd away from the base of the TFT backplane and the finger, thereby affecting the capacitances of the multiplex capacitors Cd, and achieving the acquisition and the outputting of the fingerprint information through the back surface of the display panel.

In order to protect the TFT backplane 100 and other devices on the TFT backplane 100 and reduce an impact and a damage of an external environment on the TFT backplane 100, in some embodiments, as shown in FIG. 14, the display panel further includes a protective film 140 that is disposed in the touch hole 131.

The foregoing descriptions are merely some implementation manners of the present disclosure, but the protection scope of the present disclosure is not limited thereto. The changes or replacements that any person skilled in the art can easily think of in the technical scope disclosed by the present disclosure should be within the protection scope of the present disclosure. Therefore, the protection scope of the present disclosure shall be subject to the protection scope of the claims.

What is claimed is:

1. A pixel circuit, comprising: a driving sub-circuit, a writing sub-circuit, a light-emitting device and a fingerprint information output sub-circuit, wherein
the writing sub-circuit is coupled to the driving sub-circuit, a first signal terminal and a data signal terminal, and the writing sub-circuit is configured to write a data signal from the data signal terminal to the driving sub-circuit under control of a signal from the first signal terminal;
the driving sub-circuit is further coupled to an anode of the light-emitting device and a first voltage terminal, and the driving sub-circuit is configured to drive the light-emitting device to emit light by using a voltage from the first voltage terminal, and is configured to provide a coupling capacitance to acquire fingerprint information; and
the fingerprint information output sub-circuit is coupled to the anode of the light-emitting device, a third signal terminal and a signal reading line, and the fingerprint information output sub-circuit is configured to output a signal acquired at the anode of the light-emitting device as the fingerprint information to the signal reading line under control of a signal from the third signal terminal;
wherein the driving sub-circuit includes a display driving sub-circuit and an acquisition sub-circuit;
the display driving sub-circuit is coupled to the anode of the light-emitting device and the first voltage terminal, and the display driving sub-circuit is configured to drive the light-emitting device to emit light by using the voltage from the first voltage terminal; and
the acquisition sub-circuit is coupled to the display driving sub-circuit and a second signal terminal, and the acquisition sub-circuit is configured to acquire the fingerprint information under control of a signal from the second signal terminal and the display driving sub-circuit; wherein
the acquisition sub-circuit includes an acquisition capacitor and a gating transistor;
a gate of the gating transistor is coupled to the second signal terminal, a first electrode of the gating transistor is coupled to the display driving sub-circuit, and a second electrode of the gating transistor is coupled to one end of the acquisition capacitor;
another end of the acquisition capacitor is coupled to the anode of the light-emitting device; and
one end of both ends of the acquisition capacitor serves as an electrode for providing the coupling capacitance;
or
wherein the driving sub-circuit includes a driving transistor and a multiplex capacitor;
a gate of the driving transistor is coupled to the writing sub-circuit, a first electrode of the driving transistor is coupled to the first voltage terminal, and a second electrode of the driving transistor is coupled to the anode of the light-emitting device;
one end of the multiplex capacitor is coupled to the first electrode of the driving transistor, and another end is coupled to the gate of the driving transistor; and
one end of both ends of the multiplex capacitor serves as an electrode for providing the coupling capacitance.

2. The pixel circuit according to claim 1, wherein the display driving sub-circuit includes a storage capacitor and a driving transistor;
a gate of the driving transistor is coupled to the writing sub-circuit, a first electrode of the driving transistor is coupled to the first voltage terminal, and a second electrode of the driving transistor is coupled to the anode of the light-emitting device; and
one end of the storage capacitor is coupled to the first electrode of the driving transistor, and another end is coupled to the gate of the driving transistor.

3. The pixel circuit according to claim 1, further comprising a compensation sub-circuit and a reset sub-circuit, wherein
the compensation sub-circuit is coupled to the driving sub-circuit, a fourth signal terminal and a reference voltage terminal, and the compensation sub-circuit is configured to compensate a threshold voltage of the driving sub-circuit by using a voltage from the reference voltage terminal under control of a signal from the fourth signal terminal; and
the reset sub-circuit is coupled to the light-emitting device, a fifth signal terminal and the reference voltage terminal, and the reset sub-circuit is configured to reset a potential on the anode of the light-emitting device by using the voltage from the reference voltage terminal under control of a signal from the fifth signal terminal.

4. The pixel circuit according to claim 1, further comprising an enabling light-emitting sub-circuit, wherein
the enabling light-emitting sub-circuit is coupled to the driving sub-circuit, the anode of the light-emitting device and a sixth signal terminal, and the enabling light-emitting sub-circuit is configured to enable the driving sub-circuit to drive the light-emitting device to emit light under control of a signal from the sixth signal terminal.

5. The pixel circuit according to claim 3, wherein the compensation sub-circuit includes a third transistor; and
a gate of the third transistor is coupled to the fourth signal terminal, a first electrode of the third transistor is coupled to the reference voltage terminal, and a second electrode of the third transistor is coupled to the driving sub-circuit.

6. The pixel circuit according to claim 3, wherein the reset sub-circuit includes a fourth transistor; and
a gate of the fourth transistor is coupled to the fifth signal terminal, a first electrode of the fourth transistor is coupled to the reference voltage terminal, and a second electrode of the fourth transistor is coupled to the anode of the light-emitting device.

7. The pixel circuit according to claim 4, wherein the enabling light-emitting sub-circuit includes a fifth transistor and a sixth transistor; and
a gate of the fifth transistor is coupled to the sixth signal terminal, a first electrode of the fifth transistor is coupled to the first voltage terminal, and a second electrode of the fifth transistor is coupled to the driving sub-circuit; and a gate of the sixth transistor is coupled to the sixth signal terminal, a first electrode of the sixth transistor is coupled to the driving sub-circuit, and a second electrode of the sixth transistor is coupled to the anode of the light-emitting device.

8. A display panel, comprising a TFT backplane, wherein the TFT backplane includes pixel circuits according to claim 1.

9. The display panel according to claim 8, wherein the TFT backplane further includes a pixel defining layer and a cathode layer disposed on a surface of the pixel defining layer away from the pixel circuits;
each pixel circuit includes an acquisition capacitor, through hole(s) are provided in the pixel defining layer, at least one of the through hole(s) corresponds to an acquisition capacitor;

opening(s) are provided in the cathode layer, each opening is directly opposite a corresponding through hole in a direction perpendicular to the cathode layer.

10. The display panel according to claim 8, further comprising a metal shielding film disposed on a side of the TFT backplane away from a display surface, wherein a touch hole is provided in the metal shielding film; and each pixel circuit includes a multiplex capacitor, and an orthographic projection of the multiplex capacitor on the metal shielding film is located in the touch hole.

11. The pixel circuit according to claim 1, wherein the writing sub-circuit includes a first transistor; and a gate of the first transistor is coupled to the first signal terminal, a first electrode of the first transistor is coupled to the data signal terminal, and a second electrode of the first transistor is coupled to the driving sub-circuit.

12. The pixel circuit according to claim 1, wherein the fingerprint information output sub-circuit includes a second transistor; and a gate of the second transistor is coupled to the third signal terminal, a first electrode of the second transistor is coupled to the anode of the light-emitting device, and a second electrode of the second transistor is coupled to the signal reading line.

13. The display panel according to claim 9, wherein each through hole corresponds to an acquisition capacitor;

a cross-section of the through hole in a direction perpendicular to the cathode layer has a shape of a trapezoid, and an upper edge of the trapezoid is located in a surface of the pixel defining layer adjacent to the cathode layer;

the TFT backplane further includes island electrode(s), each island electrode is disposed on an electrode of a corresponding acquisition capacitor close to the cathode layer, and is disposed in a corresponding through hole; and the island electrode is insulated from the cathode layer, and the island electrode and the cathode layer are made of a same material.

14. The display panel according to claim 13, wherein an orthographic projection of an upper opening of each through hole on a plane where the acquisition capacitor is located is within a range of an orthographic projection of a corresponding opening of the cathode layer on the plane.

* * * * *